2,997,500
SEPARATING ISOPHTHALIC AND TEREPHTHALIC ACIDS
Arthur D. Moscrip, Swarthmore, and Ivor W. Mills, Glenolden, Pa., assignors to Sun Oil Company, Philadelphia, Pa., a corporation of New Jersey
No Drawing. Filed Jan. 13, 1958, Ser. No. 708,376
5 Claims. (Cl. 260—525)

This invention relates to recovering isophthalic acid and terephthalic acid from mixtures of the two acids.

In the liquid phase partial oxidation of mixtures of m-xylene and p-xylene, a product comprising isophthalic acid and terephthalic acid is produced. It is generally desired to separate the two acids from each other. This has been accomplished in the prior art by contacting the mixture of acids with a lower alcohol, e.g. methanol, isopropanol, etc., containing usually 5 to 15 volume percent of water. Usually the amount of alcohol employed is within the approximate range from 10 to 40 parts by weight of solvent per part of mixed phthalic acids. The isophthalic acid is more soluble in the alcohol, permitting a solution of isophthalic acid concentrate in alcohol to be separated from an undissolved terephthalic acid concentrate. The respective concentrates may consist of the substantially pure isomer or may contain a small amount of the other isomer.

It is often desirable to conduct the process at an elevated temperature to take advantage of the fact that isophthalic acid is more soluble in the alcohol at higher than at lower temperatures. Some temperatures that would otherwise be desirable to use are sufficiently high that elevated pressure would be required in order to maintain the solvent in liquid phase. However in prior art operation, it has usually not been feasible to use the elevated pressure, since the usual manner of separation of phases is by filtration, and filtration under elevated pressure is a difficult operation which is to be avoided if possible.

The present invention provides a novel manner of separating terephthalic acid concentrate from an alcohol solution of isophthalic acid concentrate. The manner of operation according to the invention permits the use of relatively high temperatures, e.g. within the approximate range from 150 to 350° F. or higher, and also permits the use of elevated pressure if needed to maintain the solvent in liquid phase. The process according to the invention is also used advantageously at relatively low temperatures, for example down to room temperature. However the most advantageous operation according to the invention involves the use of relatively high temperatures as set forth previously.

The process according to the invention involves in one embodiment intimately contacting with a liquid hydrocarbon a mixture of solid terephthalic acid concentrate and alcohol solution of isophthalic acid concentrate, as obtained in a conventional phthalic acid separation process involving the use of alcohol; the resulting mixture is then permitted to resolve into an alcohol layer and a layer which comprises an emulsion of hydrocarbon in aqueous alcohol; the latter layer will subsequently be referred to as the hydrocarbon phase. After the intimate contacting and during the subsequent resolution of phases, the terephthalic acid substantially completely enters the hydrocarbon phase. Upon resolution into a hydrocarbon phase and an alcohol phase, the latter is substantially free of terephthalic acid, and substantially all of the terephthalic acid is suspended in the hydrocarbon phase.

The hydrocarbon phase containing suspended terephthalic acid is separated by ordinary layer separation techniques, from the lower alcohol phase. Terephthalic acid is then recovered from the separated hydrocarbon phase.

In one embodiment, the layer separation and the previous contacting are performed at elevated temperature and pressure, and the subsequent recovery of terephthalic acid is performed after cooling the hydrocarbon phase sufficiently to permit releasing the pressure; a subsequent separation of terephthalic acid from the hydrocarbon phase can then be accomplished at atmospheric pressure by filtration or other suitable means. Isophthalic acid can be recovered by conventional procedure from the lower alcohol phase. If desired, the alcohol phase can, prior to such conventional procedure, be treated in the manner disclosed and claimed in the A. D. Moscrip patent application Serial No. 708,657 filed of even date herewith, for separation of color bodies from the alcohol solution of isophthalic acid.

It is usually necessary, in connection with the contacting with hydrocarbon according to the invention, to adjust the water content of the alcohol solution of isophthalic acid in order to cause the formation of two immiscible liquid phases upon addition of hydrocarbon. The amount of water to be added to bring about this result depends upon the nature of the hydrocarbon and of the alcohol which are employed. Frequently the needed concentration of water based on aqueous alcohol in the system is within the approximate range from 40 to 80 volume percent. The alcohol can be concentrated later for subsequent use, by known means such as distillation, following the separation of the alcohol and hydrocarbon phases and the separation of isophthalic acid from the alcohol phase.

The formation of two liquid phases can be done substantially simultaneously with the selective dissolving of isophthalic acid in the alcohol phase. This can be brought about by introducing sufficient water with the alcohol to cause the formation of a second liquid phase comprising xylene or added hydrocarbon. However, it is preferred to perform the selective dissolving in the presence of a relatively small amount of water, e.g. 5 to 15 volume percent based on aqueous alcohol, a second liquid phase being absent during a substantial contacting period, e.g. one-half to 30 minutes. The hydrocarbon and additional water are then added, and the resulting liquid phases separated after a suitable contacting period, e.g. one-half to 30 minutes. Other contacting times can be used. The amount of water required to cause the formation of immiscible liquid phases is generally less than that which would cause substantial precipitation of isophthalic acid from the alcohol solution.

Hydrocarbons having at least 5 carbon atoms per molecule are generally suitable for use according to the invention. Examples of suitable hydrocarbons are benzene, toluene, xylene, naphthalene, tetrahydronaphthalene, decahydronaphthalene, n-pentane, petroleum naphtha, etc. Since xylene is available in systems where the phthalic acids were previously produced by partial oxidation of xylenes, it is sometimes desirable to employ the available xylene in separating the terephthalic acid from the alcohol solution of isophthalic acid concentrate. However polycyclic or at least partially cycloaliphatic hydrocarbons, e.g. decahydronaphthalene, give superior results to those obtained with xylene, and are therefore preferred for use according to the invention. The sharp separation between the hydrocarbon layer and the alcohol layer obtainable with decahydronaphthalene for example can usually not be obtained with xylene.

The process according to the invention can be used to separate phthalic acids produced under any of the well known conditions for partial oxidation of xylenes to isophthalic and terephthalic acids. Usually the temperature is within the approximate range from 250 to 400° F. and the pressure within the approximate range from atmospheric to 500 p.s.i.g. Typical oxidation catalysts employed in such processes include cobalt naphthenate, cobalt toluate, cobalt acetate, manganese naphthenate, etc.

The amount of liquid hydrocarbon which is employed in the contacting according to the invention is preferably within the approximate range from 0.5 to 50 volume percent based on the alcohol solution of isophthalic acid concentrate.

The terephthalic acid which is separated according to the invention is preferably in a finely divided state, since this facilitates entry of the terephthalic acid into the emulsion phase. Terephthalic acid as conventionally recovered from partial oxidation of p-xylene is usually sufficiently finely divided to provide satisfactory results. However it is within the scope of the invention to provide means for subdividing the terephthalic acid prior to or during the contacting with hydrocarbon. For example the agitation of the alcohol solution of isophthalic acid concentrate with the terephthalic acid concentrate can be performed under conditions which bring about subdivision of the solid terephthalic acid. In the light of the present specification, a person skilled in the art can provide suitable means for bringing about this result.

The following example illustrates the invention:

A mixture of m-xylene and p-xylene is partially oxidized in liquid phase with oxygen gas at 300° F. and 50 p.s.i.g. using cobalt naphthenate oxidation catalyst in amount to provide 0.05 weight percent cobalt based on mixed xylenes. As the oxidation continues, a portion of the liquid mixture in the oxidation zone is removed therefrom and filtered at room temperature, after addition of xylene, to remove an oxidation product comprising about 60% isophthalic acid and 40% terephthalic acid. The filtrate is recycled to the oxidation zone. The filter cake is contacted with isopropanol containing about 9 volume percent water in amount to provide about 20 parts by weight of alchol solvent per part of mixed phthalic acids. The contacting is performed at 200° F. with agitation for about two minutes at a presure of about 50 p.s.i.g. in order to maintain the alcohol in liquid phase. The isophthalic acid selectively dissolves in the alcohol to form a solution of an isophthalic acid concentrate, in which undissolved solid terephthalic acid concentrate is suspended. The water content of the solution is adjusted to about 50 volume percent. Twenty-five volume percent of decahydronaphthalene based on the alcohol solution is added, and the resulting mixture is agitated at 200° F. and 50 p.s.i.g. for about two minutes to provide good contact of the respective materials. Subsequently the mixture is allowed to settle. The decahydronaphthalene rises through the alcohol phase, and the solid terephthalic acid rises along with it and enters the upper decahydronaphthalene emulsion phase which is formed. The terephthalic acid is attracted to the surfaces of the hydrocarbon droplets and stabilizes the emulsion, and the emulsion containing terephthalic acid forms a layer separate from the excess aqueous alcohol.

The upper decahydronaphthalene phase is separated at 200° F. and 50 p.s.i.g. from the lower alcohol phase. An isophthalic acid concentrate is recovered from the latter in the conventional manner, e.g. by distillation. The hydrocarbon layer is cooled to room temperature, and the pressure is reduced to atmospheric pressure. Terephthalic acid concentrate is then filtered at atmospheric pressure from the hydrocarbon layer. The decahydronaphthalene and alcohol in the filtrate are recycled for further use in contacting mixtures of isophthalic acid and terephthalic acid.

Generally similar results to those obtained with decahydronaphthalene are obtained employing other hydrocarbons such as those disclosed previously. However decahydronaphthalene is superior to at least some of the hydrocarbons with respect to the sharpnes of separation of phases.

The hydrocarbon which is employed in the contacting according to the invention can be either heavier or lighter than the alcohol solution of isophthalic acid concentrate. The direction of resolution of phases, i.e. whether the hydrocarbon phase becomes the upper or lower phase, is determined by a combination of factors including the relative densities of the alcohol and hydrocarbon, the relative amounts of isophthalic acid concentrate, alcohol and water in the alcohol phase, and the relative amounts of terephthalic acid concentrate and hydrocarbon in the hydrocarbon phase. Temperature is an important factor concerning relative densities, since the hydrocarbon generally decreases in density more rapidly with increasing temperature than does the aqueous alcohol. Therefore, the hydrocarbon emulsion is more likely to rise at elevated temperatures.

The relative densities of the hydrocarbon and of the aqueous alcohol are usually the most important factors. Thus, it is unusual for the emulsion to descend if the hydrocarbon is less dense than the aqueous alcohol, and vice versa. At room temperature, for example, a decahydronaphthalene emulsion usually rises if the aqueous alcohol contains less than 40% alcohol, and usually descends if the aqueous alcohol contains more than 60% alcohol. At intermediate concentrations of alcohol, the direction of phase movement may depend on other factors. Regardless of the direction of phase movement, the terephthalic acid collects in the emulsion phase.

The process according to the invention is also useful in separating an alkali metal, e.g., sodium, potassium, lithium, etc., or ammonium salt of terephthalic acid from an aqueous solution of a similar salt of isophthalic acid. The separation of sodium isophthalate from sodium terephthalate for example, based on differences in their solubilities in water, is known in the art. The usual manner of separating the phases is by filtration. In the separation of the salts, a lower alcohol as previously described may be present, for example in amount to provide a solvent containing 10 to 90% of alcohol and 10 to 90% of water. However it is also possible to perform the process in the absence of alcohol.

As an example of the application of the process according to the invention to separation of phthalic acids in the salt form, reference is made to operation as described in the preceding example, the mixture of isophthalic acid and terephthalic acid being previously converted however to the corresponding sodium salts by contact with sodium hydroxide. The resulting salts are then contacted with an amount of water which is insufficient to dissolve the sodium terephthalate, with the result that a mixture of undissolved sodium terephthalate and an aqueous solution of isophthalate is formed. The temperature and pressure employed are room temperature and atmospheric pressure respectively. Decahydronaphthalene is then added and subsequent operation performed in a manner similar to that described in the preceding example.

The invention claimed is:

1. Process for separating isophthalic acid from terephthalic acid, and for separating salts of these acids, which comprises: (1) intimately contacting, at a temperature in the approximate range of from about room temperature to about 350° F., a mixture of an undissolved solid and a solvent containing dissolved solute, with from about 0.5 to about 50.0 volume per cent, based on said mixture, of a liquid hydrocarbon selected from the group consisting of a benzene, toluene, xylene, naphthalene, tetrahydronaphthalene, decahydronaphthalene, n-pentane and petroleum naphtha, said solid being selected from the group consisting of terephthalic acid, an alkali metal salt of terephthalic acid and the ammonium salt of terephthalic acid, said solute being selected from the group consisting of isophthalic acid, an alkali metal salt of isophthalic acid and the ammonium salt of isophthalic acid, said solute being a salt when said solid is a salt, and said solvent being selected from the group consisting of water and an aqueous alkanol having from 1 to 3 carbon atoms per molecule, said aqueous alkanol containing water in a concentration sufficient to cause the formation of two immiscible liquid phases upon the contacting of the said mixture with the said hydrocarbon; and (2) separating a hydrocarbon-rich phase containing said solid in suspension from a solvent-rich phase containing dissolved solute.

2. Process according to claim 1 wherein said solid is terephthalic acid, said solute is isophthalic acid and said solvent is an aqueous alkanol having from 1 to 3 carbon atoms per molecule.

3. Process according to claim 1 wherein said contacting is performed at a temperature within the approximate range from 150 to 350° F.

4. Process according to claim 1 wherein said hydrocarbon is decahydronaphthalene.

5. Process for separating isophthalic acid from terephthalic acid which comprises intimately contacting a mixture of a solid terephthalic acid concentrate and a solution of isophthalic acid concentrate in isopropanol containing 40 to 80 volume percent water, with 0.5 to 50 volume percent of liquid decahydronaphthalene based on said solution, the temperature of contacting being in the approximate range from room temperature to 350° F., separating a suspension of solid terephthalic acid concentrate in an upper phase comprising an emulsion of decahydronaphthalene in a portion of said solution from a lower phase comprising the remainder of said solution, and separating a solid terephthalic acid concentrate from the separated upper phase.

References Cited in the file of this patent

UNITED STATES PATENTS

| | | |
|---|---|---|
| 1,955,065 | Hawley | Apr. 17, 1934 |
| 2,732,399 | Carlston et al. | Jan. 24, 1956 |
| 2,741,633 | McKinnis et al | Apr. 10, 1956 |
| 2,761,563 | Waterman et al. | Sept. 4, 1956 |

OTHER REFERENCES

Glasstone, Textbook of Physical Chemistry, 2 ed., pages 1275–1280 (1946).